US012231873B2

(12) United States Patent
Watanabe et al.

(10) Patent No.: US 12,231,873 B2
(45) Date of Patent: Feb. 18, 2025

(54) OPERATION TERMINAL, AUDIO DEVICE, AUDIO SYSTEM, AND COMPUTER-READABLE PROGRAM

(71) Applicant: D&M Holdings, Inc., Kanagawa (JP)

(72) Inventors: Keita Watanabe, Kanagawa (JP); Yuki Takahashi, Kanagawa (JP)

(73) Assignee: D&M Holdings, Inc., Kanagawa (JP)

( * ) Notice: Subject to any disclaimer, the term of this patent is extended or adjusted under 35 U.S.C. 154(b) by 14 days.

(21) Appl. No.: 17/607,064

(22) PCT Filed: Mar. 30, 2020

(86) PCT No.: PCT/JP2020/014561
§ 371 (c)(1),
(2) Date: Oct. 28, 2021

(87) PCT Pub. No.: WO2020/225998
PCT Pub. Date: Nov. 12, 2020

(65) Prior Publication Data

US 2022/0210598 A1 Jun. 30, 2022

(30) Foreign Application Priority Data

May 8, 2019 (JP) ................................ 2019-088683

(51) Int. Cl.
*H04S 7/00* (2006.01)
*H04R 5/02* (2006.01)
*H04S 3/00* (2006.01)

(52) U.S. Cl.
CPC ................ *H04S 7/308* (2013.01); *H04R 5/02* (2013.01); *H04R 2205/024* (2013.01);
(Continued)

(58) Field of Classification Search
CPC .......... H04S 7/308; H04S 7/302; H04S 7/301; H04S 3/00; H04R 5/02; H04R 2420/07; H04R 2205/024
See application file for complete search history.

(56) References Cited

U.S. PATENT DOCUMENTS

2001/0008531 A1* 7/2001 Lanigan .......... H04N 21/43632 370/428
2002/0140859 A1 10/2002 Kariatsumari et al.
(Continued)

FOREIGN PATENT DOCUMENTS

EP 3059980 B1 11/2017
JP 2002-367290 12/2002
(Continued)

*Primary Examiner* — Carolyn R Edwards
*Assistant Examiner* — Kuassi A Ganmavo
(74) *Attorney, Agent, or Firm* — Nieves IP Law Group, LLC; Peter A. Nieves

(57) ABSTRACT

[Problem] To enable the desired number of channels to be listened to at a lower cost and without wasting resources. [Solution] Process multi-channel digital audio signals by coordinating between a plurality of AV amp devices 1. An operation terminal 5 assigns audio channels to be processed, to each AV amp device 1, and, on the basis of the signal processing time for each AV amp device 1, determines an output delay time for each AV amp device 1 so that the output timing for analog audio signals matches for all AV amp devices 1. Each AV amp device 1 decodes input digital audio signals into analog audio signals for audio channels assigned to that AV amp device 1 by the operation terminal 5 and delays the output of the decoded analog audio signal, by the output delay time for that AV amp device 1 determined by the operation terminal 5.

12 Claims, 10 Drawing Sheets

(52) U.S. Cl.
CPC ............ *H04R 2420/07* (2013.01); *H04S 3/00* (2013.01); *H04S 7/301* (2013.01); *H04S 7/302* (2013.01)

(56) References Cited

U.S. PATENT DOCUMENTS

2004/0249490 A1* 12/2004 Sakai ..................... H04H 20/28 381/77
2004/0258259 A1* 12/2004 Koyama .............. H04R 29/008 381/19
2005/0044570 A1* 2/2005 Poslinski ........... H04N 21/4383 725/50
2005/0190928 A1* 9/2005 Noto ........................ H04R 3/12 381/2
2007/0038999 A1 2/2007 Millington
2007/0087686 A1* 4/2007 Holm ........................ H04S 7/30 455/3.06
2008/0045140 A1 2/2008 Korhonen
2008/0077261 A1 3/2008 Baudino et al.
2009/0290064 A1* 11/2009 Matsumoto .......... H04N 21/439 725/116
2010/0238107 A1* 9/2010 Ohki ..................... G06F 3/0488 345/156
2011/0142245 A1* 6/2011 Toba ................ G11B 20/10527 381/22
2011/0187927 A1* 8/2011 Simon .............. H04N 21/43072 348/E5.009
2011/0310308 A1* 12/2011 Asayama ......... H04N 21/44231 348/E5.122
2014/0139738 A1 5/2014 Mehta et al.
2016/0196106 A1* 7/2016 Hammer .................. H04R 3/12 381/79
2016/0212534 A1 7/2016 Le Nerriec et al.
2017/0115740 A1* 4/2017 Kim ................. H04N 21/43635
2017/0257722 A1* 9/2017 Kerdranvat ............. H04S 3/002
2017/0374484 A1 12/2017 Lando et al.
2018/0077491 A1 3/2018 Butler et al.
2018/0184223 A1* 6/2018 Lee ........................... H03F 3/68
2019/0075398 A1 3/2019 Shirai et al.
2022/0225046 A1 7/2022 Imahama et al.

FOREIGN PATENT DOCUMENTS

JP 2005-217559 8/2005
JP 2007151173 A 6/2007
JP 2009-135750 6/2009
JP 2010004520 1/2010
JP 2010-68536 3/2010
JP 2010-166534 7/2010
JP 2017103711 A 6/2017
WO 2013146602 10/2013

* cited by examiner

AV AMPLIFIER DEVICE 1

OPERATION TERMINAL, AUDIO DEVICE, AUDIO SYSTEM, AND COMPUTER-READABLE PROGRAM

CROSS-REFERENCE TO RELATED APPLICATIONS

This application is the national stage of International Application No. PCT/JP2020/014561, filed Mar. 30, 2020, entitled OPERATION TERMINAL, AUDIO DEVICE, AUDIO SYSTEM, AND COMPUTER-READABLE PROGRAM which claims the benefit of Japanese Patent Application serial number 2019-088683, filed May 8, 2019, both of which are incorporated by reference herein in their entirety.

TECHNICAL FIELD

The present invention relates to a technology of processing a multi-channel digital audio signal.

BACKGROUND ART

Hitherto, an audio device for processing a multi-channel digital audio signal has been known. For example, an audio reproduction device described in Patent Literature 1 decodes a 5.1 channel digital audio signal into analog audio signals for a front left channel, a front right channel, a center channel, a surround left channel, a surround right channel, and a subwoofer channel, amplifies the analog audio signals, and outputs each of the analog audio signals from a corresponding output terminal.

CITATION LIST

Patent Literature

[PTL 1] JP 2002-367290 A

SUMMARY OF INVENTION

Technical Problem

In recent years, a 7.1 channel digital audio signal in which a surround back left channel and a surround back right channel are added to the 5.1 channels described above is becoming a main stream. For home use, Auro-3D (trademark) adaptable to up to 13.1 channels, Dolby Atoms (trademark) for Home adaptable to up to 24.1.10 channels, and others have been proposed, and a channel count of audio channels is on an ever-increasing trend.

Considering this situation, it is likely that a new digital audio signal supporting a channel count higher than an adaptable channel count of an audio device owned by a user comes to be in use before long. In order to listen to this new digital audio signal at a channel count higher than the adaptable channel count of the audio device owned by the user, the user is required to purchase a new audio device adaptable to this channel count to replace the owned audio device.

However, an audio device with a high adaptable channel count is generally expensive. It is costly to purchase a new audio device every time a digital audio signal is to be listened to at a channel count higher than the adaptable channel count of the owned audio device. In addition, the owned audio device that is no longer used is a waste of resources.

The present invention has been made in view of the circumstances described above, and is to provide a technology with which listening at a desired channel count is accomplished at a lower cost without wasting resources.

Solution to Problem

To solve the problems described above, in the present invention, an operation terminal causes a plurality of audio devices to process a multi-channel digital audio signal through cooperation among the plurality of audio devices. The operation terminal distributes audio channels to be processed among those audio devices, and determines, based on a signal processing time of each of the audio devices, an output delay time of each of the audio devices so that timing of outputting an analog audio signal matches for all of the audio devices. Each of the audio devices decodes the multi-channel digital audio signal input thereto into an analog audio signal for the audio channel distributed by the operation terminal to an own device, and outputs the analog audio signal created by the decoding with a delay of the output delay time determined by the operation terminal for the own device.

For example, according to one embodiment of the present invention, there is provided an operation terminal for causing a plurality of audio devices to process a multi-channel digital audio signal through cooperation among the plurality of audio devices, the operation terminal including: performance information acquisition means configured to acquire, from each one of the plurality of audio devices, performance information including an adaptable channel count and a signal processing time of the one of the plurality of audio devices; channel distribution means configured to distribute an audio channel to be processed to each of the plurality of audio devices, based on the adaptable channel count included in the performance information acquired by the performance information acquisition means from each of the plurality of audio devices; output delay time determination means configured to determine, for each of the plurality of audio devices, an output delay time so that timing of outputting an analog audio signal matches in the plurality of audio devices, based on the signal processing time included in the performance information acquired by the performance information acquisition means from each of the plurality of audio devices; and settings information notification means configured to notify, to each one of the plurality of audio devices, settings information including the audio channel to be processed that is distributed to the one of the plurality of audio devices by the channel distribution means and the output delay time determined for the one of the plurality of audio devices by the output delay time determination means.

Further, according to one embodiment of the present invention, there is provided an audio device for processing, in accordance with an instruction from an operation terminal, a multi-channel digital audio signal through cooperation with another audio device, the audio device including: audio signal processing means configured to decode the multi-channel digital audio signal input thereto into an analog audio signal for an audio channel included in settings information notified from the operation terminal; and audio output delay means configured to output the analog audio signal created through decoding by the audio signal processing means with a delay of an output delay time included in the settings information notified from the operation terminal.

Further, according to one embodiment of the present invention, there is provided an audio system for processing a multi-channel digital audio signal, the audio system including: the above-mentioned operation terminal; and a plurality of audio devices configured to process, in accordance with an instruction from the operation terminal, a multi-channel digital audio signal through cooperation with one another, wherein each of the plurality of audio devices includes: audio signal processing means configured to decode the multi-channel digital audio signal input thereto into an analog audio signal for an audio channel included in settings information notified from the operation terminal; and audio output delay means configured to output the analog audio signal created through decoding by the audio signal processing means with a delay of an output delay time included in the settings information notified from the operation terminal.

Advantageous Effects of Invention

In the present invention, the audio channels to be processed are distributed among the plurality of audio devices and the output delay time is determined for each of the audio devices, and thus the plurality of audio devices are caused to process a multi-channel digital audio signal through cooperation with one another. Therefore, the multi-channel digital audio signal can be listened to at a channel count too high to be dealt with a single audio device, and a user can increase the channel count by adding to an audio device owned by the user, instead of replacing the owned audio device with a newly purchased audio device. According to the present invention, listening at a desired channel count is thus accomplished at a lower cost without wasting resources.

DESCRIPTION OF EMBODIMENTS

Now, one embodiment of the present invention is described with reference to the accompanying drawings.

Figure 1:
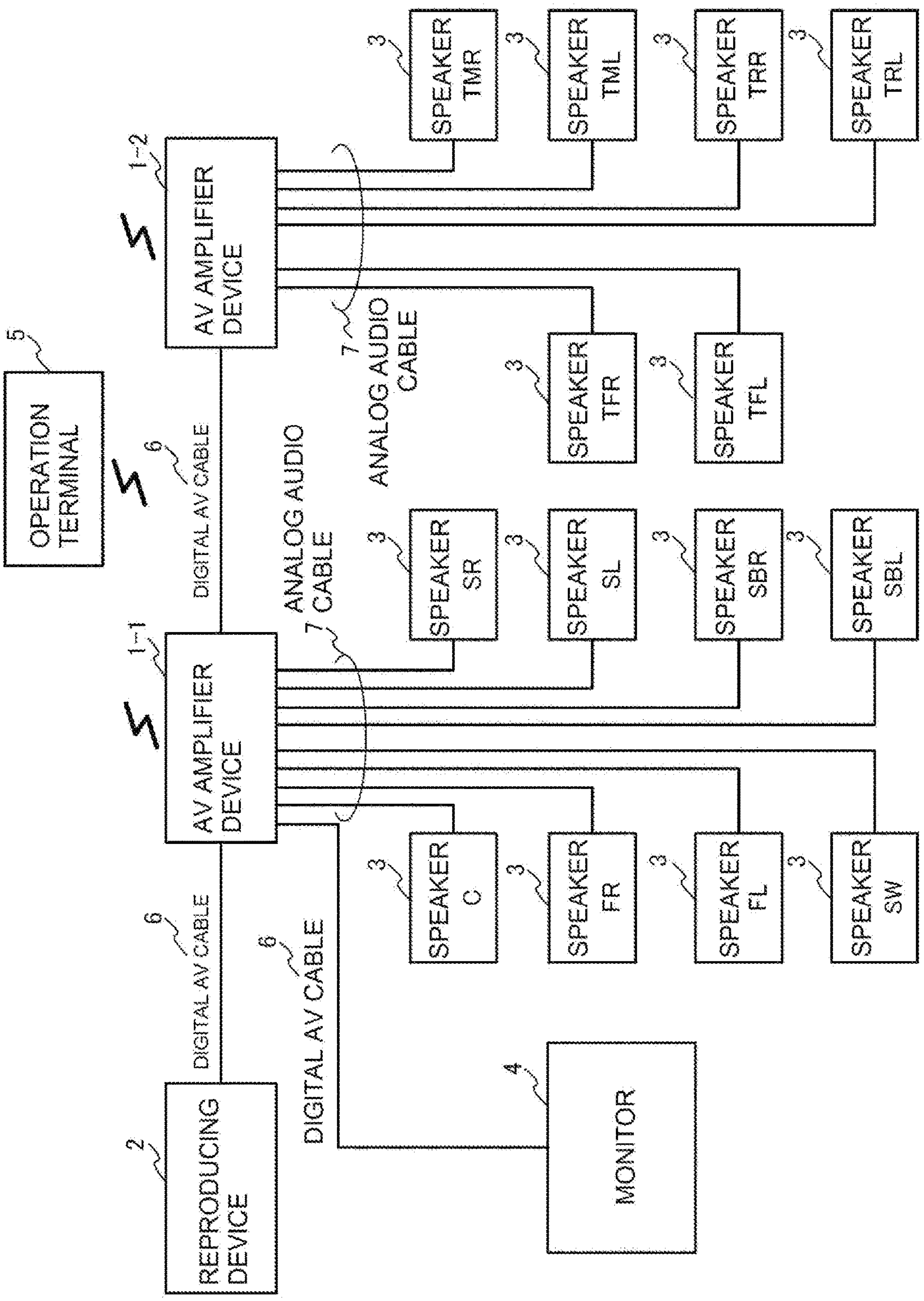
FIG. 1 is a schematic configuration diagram of an AV system according to one embodiment of the present invention.

FIG. 1 is a schematic configuration diagram of an audio visual (AV) system according to this embodiment.

As illustrated in the figure, the AV system according to this embodiment includes a plurality of AV amplifier devices 1-1 and 1-2 (hereinafter may simply be referred to as "AV amplifier devices 1"), a reproducing device 2, a plurality of speakers 3, a monitor 4, and an operation terminal 5 for remotely operating the AV amplifier devices 1.

The reproducing device 2, the AV amplifier devices 1, and the monitor 4 each include an HDMI (trademark). Digital AV cables 6 compatible with the HDMI (trademark) are used to connect between the reproducing device 2 and the AV amplifier device 1-1, between the AV amplifier device 1-1 and the monitor 4, and between the AV amplifier device 1-1 and the AV amplifier device 1-2. Each of the speakers 3 is connected to one of the AV amplifier devices 1 via an analog audio cable 7. The AV amplifier devices 1 and the operation terminal 5 are connected to each other by Wi-Fi (trademark), Bluetooth (trademark), or other forms of near field communication.

The AV amplifier devices 1 reproduce a digital AV signal including a multi-channel digital audio signal and a multi-channel digital video signal in conformity to Auro-3D (trademark), Dolby Atoms (trademark) for Home, or a similar reproduction method. In this embodiment, the AV amplifier devices 1 are assumed to be adaptable to up to 7.1 channels (a front left channel FL, a front right channel FR, a center channel C, a surround left channel SL, a surround right channel SR, a surround back left channel SBL, a surround back right channel SBR, and a subwoofer channel SW).

The reproducing device 2 reproduces a digital AV signal supporting a plurality of channel counts, and outputs the digital AV signal as an HDMI (trademark) signal. In this embodiment, the digital AV signal is assumed to support a plurality of channel counts including a channel count of 7.1.6 channels (the front left channel FL, the front right channel FR, the center channel C, the surround left channel SL, the surround right channel SR, the surround back left channel SBL, the surround back right channel SBR, the subwoofer channel SW, a top front left channel TFL, a top front right channel TFR, a top middle left channel TML, a top middle right channel TMR, a top rear left channel TRL, and a top rear right channel TRR).

The speakers 3 are provided so as to correspond, on a one-to-one basis, to the audio channels counted in a channel count of the AV system, and each output an audio signal of the corresponding audio channel. In this embodiment, 7.1.6 channels are assumed to be the channel count.

The operation terminal 5 sets, in the AV amplifier devices 1-1 and 1-2, information required to process, through cooperation between the AV amplifier devices 1-1 and 1-2, a multi-channel digital audio signal included in the digital AV signal that is output from the reproducing device 2.

In the AV system configured as described above, the operation terminal 5 distributes audio channels to be processed between the AV amplifier devices 1-1 and 1-2. Here, out of the 7.1.6 channels, the front left channel FL, the front right channel FR, the center channel C, the surround left channel SL, the surround right channel SR, the surround back left channel SBL, the surround back right channel SBR, and the subwoofer channel SW are distributed to the AV amplifier device 1-1, and the rest of the channels, namely, the top front left channel TFL, the top front right channel TFR, the top middle left channel TML, the top middle right channel TMR, the top rear left channel TRL, and the top rear right channel TRR, are distributed to the AV amplifier device 1-2. The operation terminal 5 also determines an output delay time for each of the AV amplifier devices 1-1 and 1-2, based on a signal processing time of the monitor 4 (a time required to create display data by decoding from the digital video signal included in the digital AV signal) and a signal processing time of each of the AV amplifier devices 1-1 and 1-2 (a time required to create an analog audio signal by decoding from the digital audio signal included in the digital AV signal) so that timing of outputting the analog audio signal from each of the AV amplifier devices 1-1 and 1-2 is in synchronization with video output from the monitor 4 (Auto Lip-Sync). The operation terminal 5 then sets the determined output delay time to each of the AV amplifier devices 1-1 and 1-2.

The AV amplifier device 1-1 relays the digital AV signal output from the reproducing device 2 to the monitor 4 and the AV amplifier device 1-2. The AV amplifier device 1-1 also decodes the multi-channel digital audio signal included in the digital AV signal output from the reproducing device 2 into analog audio signals of the front left channel FL, the front right channel FR, the center channel C, the surround left channel SL, the surround right channel SR, the surround back left channel SBL, the surround back right channel SBR, and the subwoofer channel SW distributed to the own device 1-1, and amplifies the analog audio signals. The AV amplifier device 1-1 delays the analog audio signals of the audio channels by the output delay time set to the own device 1-1, and then outputs the analog audio signals to the corresponding speakers 3 for the audio channels.

The AV amplifier device 1-2 decodes the digital AV signal output from the AV amplifier device 1-1 into analog audio signals of the top front left channel TFL, the top front right channel TFR, the top middle left channel TML, the top middle right channel TMR, the top rear left channel TRL, and the top rear right channel TRR distributed to the own device 1-2, and amplifies the analog audio signals. The AV amplifier device 1-2 delays the analog audio signals of the audio channels by the output delay time set to the own device 1-2, and then outputs the analog audio signals to the corresponding speakers 3 for the audio channels.

Details of the AV amplifier devices 1 and the operation terminal 5 which form the AV system according to this embodiment are described next. Detailed descriptions on the reproducing device 2, the speakers 3, and the monitor 4, to which existing devices are applicable, are omitted.

Details of the AV amplifier devices 1 are described first.

Figure 2:
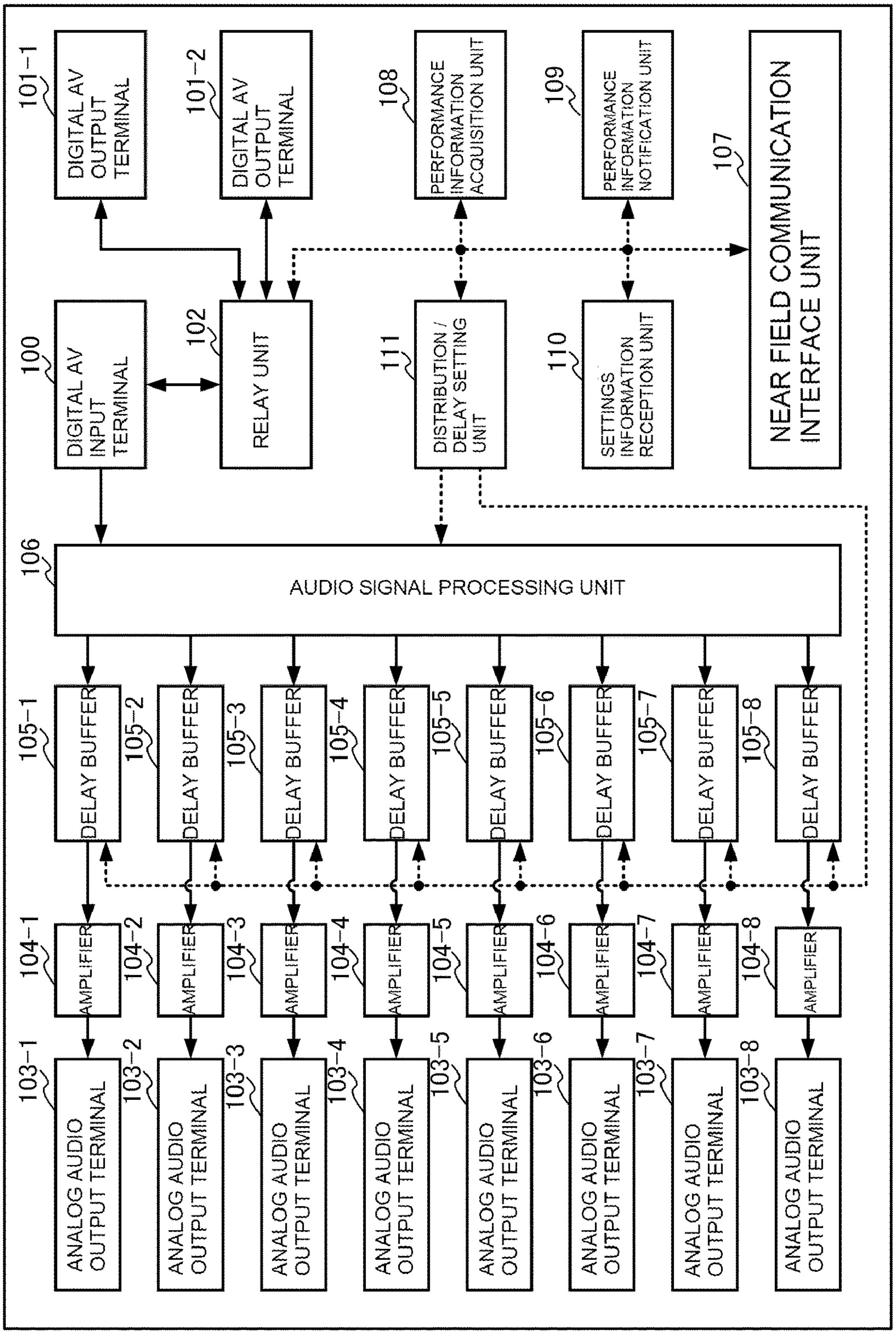
FIG. 2 is a schematic function configuration diagram of each of AV amplifier devices (1).

FIG. 2 is a schematic function configuration diagram of each of the AV amplifier devices 1.

As illustrated in the figure, the AV amplifier devices 1 each include a digital AV input terminal 100, a plurality of digital AV output terminals 101-1 and 101-2 (hereinafter may simply be referred to as “digital AV output terminals 101”), a relay unit 102, a plurality of analog audio output terminals 103-1 to 103-8 (hereinafter may simply be referred to as “analog audio output terminals 103”), a plurality of amplifiers 104-1 to 104-8 (hereinafter may simply be referred to as “amplifiers 104”), a plurality of delay buffers 105-1 to 105-8 (hereinafter may simply be referred to as “delay buffers 105”), an audio signal processing unit 106, a near field communication interface unit 107, a performance information acquisition unit 108, a performance information notification unit 109, a settings information reception unit 110, and a distribution/delay setting unit 111.

The digital AV input terminal 100 is connected to the reproducing device 2 or another of the AV amplifier devices 1 via one of the digital AV cables 6, and a digital AV signal is input thereto.

The digital AV output terminal 101 is connected to the monitor 4 or another of the AV amplifier devices 1 via one of the digital AV cables 6, and a digital AV signal is output therefrom.

The relay unit 102 relays the digital AV signal input to the digital AV input terminal 100 to the digital AV output terminals 101.

Each of the analog audio output terminals 103 is connected to one of the speakers 3 via the analog audio cable 7, and outputs an analog audio signal to the connected one of the speakers 3.

The amplifiers 104 are each provided for one of the analog audio output terminals 103, and each amplify an analog audio signal input thereto and output the amplified analog audio signal to the corresponding one of the analog audio output terminals 103.

The delay buffers 105 are each provided for one of the amplifiers 104, and each output an analog audio signal input thereto to the corresponding one of the amplifiers 104 after buffering the analog audio signal by a set output delay time.

The audio signal processing unit 106 decodes, for each audio channel distributed to its own device which is one of the AV amplifier devices 1, the multi-channel digital audio signal included in the digital AV signal input to the digital AV input terminal 100 into an analog audio signal of the corresponding audio channel. The audio signal processing unit 106 outputs this analog audio signal to one of the amplifiers 104 connected to one of the analog audio output terminals 103 that is allocated the corresponding audio channel.

The near field communication interface unit 107 is an interface for connecting to the operation terminal 5 by Wi-Fi (trademark), Bluetooth (trademark), or other forms of near field communication.

The performance information acquisition unit 108 acquires, when the reproducing device 2 is connected to the digital AV input terminal 100 via one of the digital AV cables 6, performance information including an adaptable channel count (a maximum channel count supported by the multi-channel digital audio signal included in the digital AV signal) from the reproducing device 2. The performance information acquisition unit 108 also acquires, when the monitor 4 is connected to one of the digital AV output terminals 101 via one of the digital AV cables 6, performance information including a signal processing time from the monitor 4. Those pieces of performance information can be acquired by issuing inquiries with the use of a Consumer Electronics Control (CEC) command of the HDMI (trademark) to the device connected to the digital AV input terminal 100 and the device connected to the one of the digital AV output terminals 101.

The performance information notification unit 109 notifies to the operation terminal 5, in response to an inquiry received about the performance information from the operation terminal 5 via the near field communication interface unit 107, the performance information including the adaptable channel count of its own device which is one of the AV amplifier devices 1, a configuration of the analog audio output terminals 103, and a signal processing time. When the performance information of the reproducing device 2 and/or the performance information of the monitor 4 which are acquired by the performance information acquisition unit 108 are available at that time, the performance information notification unit 109 notifies those pieces of performance information to the operation terminal 5 along with those pieces of performance information.

The settings information reception unit 110 receives settings information from the operation terminal 5 via the near field communication interface unit 107.

The distribution/delay setting unit 111 sets, in the audio signal processing unit 106, audio channels included in the settings information received by the settings information reception unit 110 from the operation terminal 5 as audio channels distributed to its own device which is one of the AV amplifier devices 1. The distribution/delay setting unit 111 also sets, in the delay buffers 105, an output delay time included in the settings information received by the settings information reception unit 110 from the operation terminal 5 as an output delay time of its own device which is one of the AV amplifier devices 1.

Next, operation of the AV amplifier devices 1 is described.

Setting operation of the AV amplifier devices 1 is described first.

Figure 3:
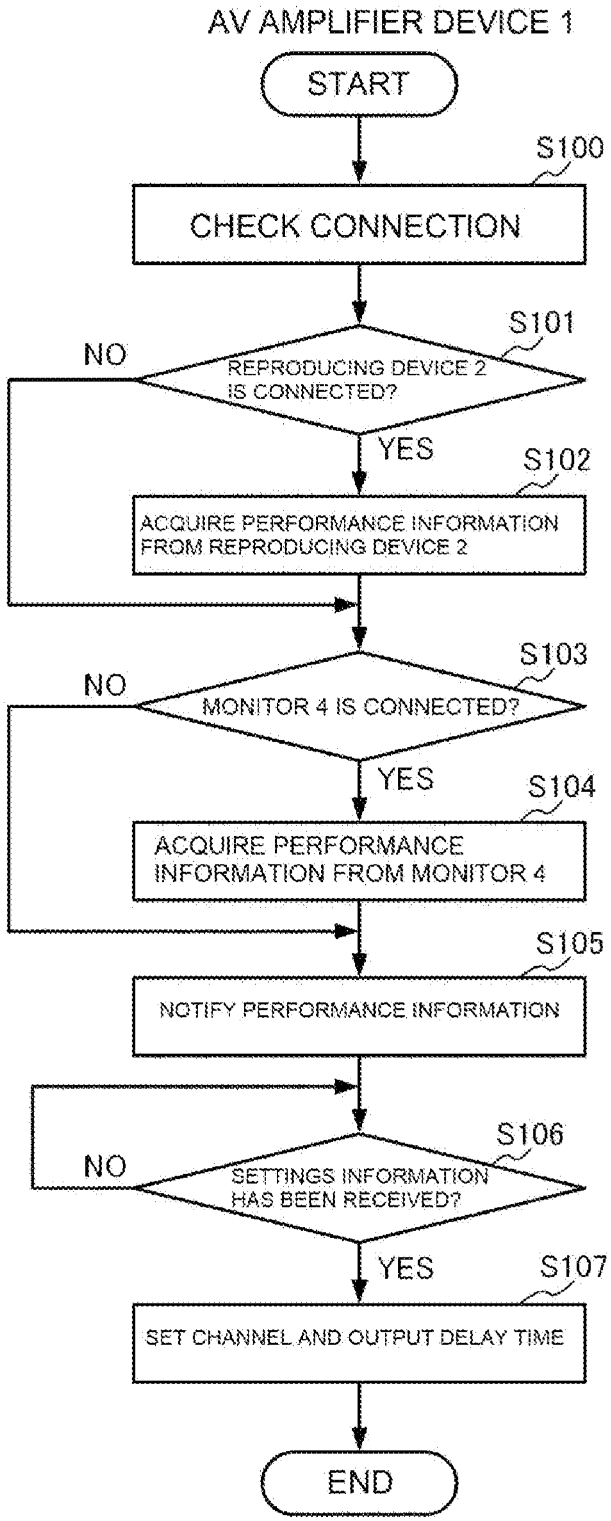
FIG. 3 is a flow chart for illustrating setting operation of the AV amplifier devices (1).

FIG. 3 is a diagram for illustrating setting operation of the AV amplifier devices 1.

This flow is started upon reception of an inquiry about the performance information at the near field communication interface unit 107 from the operation terminal 5.

First, the performance information acquisition unit 108 determines whether a device is connected to the digital AV input terminal 100 via one of the digital AV cables 6. When there is a device connected thereto, the performance information acquisition unit 108 issues an inquiry to the connected device, and receives a response to the inquiry to check a type of the connected device. Similarly, the performance information acquisition unit 108 determines, for each one of the digital AV output terminals 101, whether a device is connected to the one of the digital AV output terminals 101 via one of the digital AV cables 6. When there is a device connected thereto, the performance information acquisition unit 108 issues an inquiry to the connected device, and receives a response to the inquiry to check a type of the connected device (Step S100). A CEC command of the HDMI (trademark) can be used for the inquiries to the connected devices.

When it is confirmed that the reproducing device 2 is connected to the digital AV input terminal 100 ("YES" in Step S101), the performance information acquisition unit 108 transmits an inquiry about the performance information to the reproducing device 2 from the digital AV input terminal 100 via the relay unit 102, and acquires the performance information including an adaptable channel count from the reproducing device 2 (Step S102).

When it is confirmed that the monitor 4 is connected to one of the digital AV output terminals 101 ("YES" in Step S103), the performance information acquisition unit 108 transmits an inquiry about the performance information to the monitor 4 from the one of the digital AV output terminals 101 via the relay unit 102, and acquires the performance information including a signal processing time from the monitor 4 (Step S104).

Next, the performance information notification unit 109 notifies the performance information including the adaptable channel count of its own device which is one of the AV amplifier devices 1, the configuration of the analog audio output terminals 103, and a signal processing time to the operation terminal 5 via the near field communication interface unit 107, as well as the performance information of the reproducing device 2 acquired from the reproducing device 2 and the performance information of the monitor 4 acquired from the monitor 4 when those pieces of performance information are already acquired by the performance information acquisition unit 108 (Step S105).

The settings information reception unit 110 waits for the transmission of the settings information from the operation terminal 5 via the near field communication interface unit 107 (Step S106). When the settings information has been received from the operation terminal 5 ("YES" in Step S106), the settings information reception unit 110 notifies audio channels to be processed, the analog audio output terminals 103, and an output delay time that are included in the settings information to the distribution/delay setting unit 111. The notified audio channels are audio channels distributed to its own device which is one of the AV amplifier devices 1 to be processed, the notified analog audio output terminals 103 are the analog audio output terminals 103 to which the audio channels to be processed are allocated, and the notified output delay time is the output delay time of its own device 1.

In response, the distribution/delay setting unit 111 sets, in the audio signal processing unit 106, the audio channels to be processed that are notified from the settings information reception unit 110, along with the analog audio output terminals 103 to which the audio channels are allocated. The distribution/delay setting unit 111 also sets, in the delay buffers 105, the output delay time notified from the settings information reception unit 110 (Step S107).

Operation of digital AV signal processing of the AV amplifier devices 1 is described next.

In FIG. 2, the digital AV input terminal 100 outputs a digital AV signal input thereto to the relay unit 102 and the audio signal processing unit 106.

In response, the relay unit 102 outputs the digital AV signal from the digital AV output terminal 101-1 when a device is connected to the digital AV output terminal 101-1 via one of the digital AV cables 6. Similarly, the relay unit 102 outputs the digital AV signal from the digital AV output terminal 101-2 when a device is connected to the digital AV output terminal 101-2 via one of the digital AV cables 6.

The audio signal processing unit 106 decodes, for each audio channel set by the distribution/delay setting unit 111, a multi-channel digital audio signal included in the digital AV signal into an analog audio signal of the corresponding audio channel. The audio signal processing unit 106 outputs this analog audio signal to one of the delay buffers 105 that is connected via one of the amplifiers 104 to one of the analog audio output terminals 103 to which the corresponding audio channel is allocated.

When the analog audio signal is input, the one of the delay buffers 105 buffers this analog audio signal by the output delay time set by the distribution/delay setting unit 111, and then outputs the analog audio signal to the corresponding one of the amplifiers 104. When the analog audio signal is input, the one of the amplifiers 104 amplifies this analog audio signal and outputs the analog audio signal to the corresponding one of the analog audio output terminals 103.

Next, details of the operation terminal 5 are described.

Figure 4:
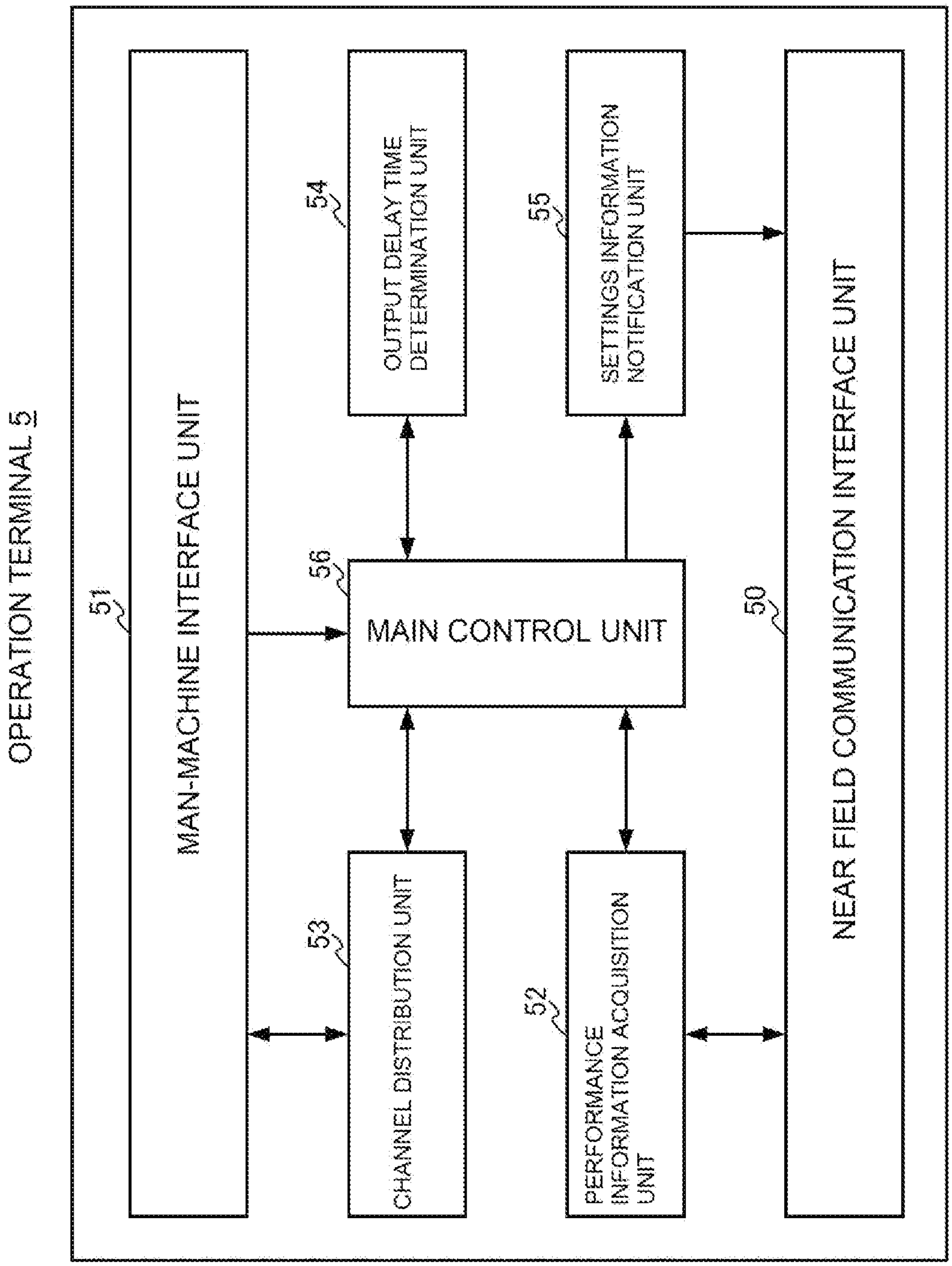
FIG. 4 is a schematic function configuration diagram of an operation terminal (5).

FIG. 4 is a schematic function configuration diagram of the operation terminal 5.

As illustrated in the figure, the operation terminal 5 includes a near field communication interface unit 50, a man-machine interface unit 51, a performance information acquisition unit 52, a channel distribution unit 53, an output delay time determination unit 54, a settings information notification unit 55, and a main control unit 56.

The near field communication interface unit 50 is an interface for connecting to the AV amplifier devices 1 by Wi-Fi (trademark), Bluetooth (trademark), or other forms of near field communication.

The man-machine interface unit 51 is an interface for presenting information to a user and receiving the user's various types of operation, and is configured from, for example, a touch-sensitive display.

The performance information acquisition unit 52 acquires, via the near field communication interface unit 50, from each one of the AV amplifier devices 1, the performance information of the one of the AV amplifier devices 1 including an adaptable channel count, the configuration of the analog audio output terminals 103, and a signal processing time. The performance information acquisition unit 52 also acquires the performance information of the reproducing device 2 including the adaptable channel count of the reproducing device 2 from one of the AV amplifier devices 1 to which the reproducing device 2 is connected (in FIG. 1, the AV amplifier device 1-1), and acquires the performance information of the monitor 4 including a signal processing time from one of the AV amplifier devices 1 to which the monitor 4 is connected (in FIG. 1, the AV amplifier device 1-2).

The channel distribution unit 53 identifies channel counts reachable through cooperation of the plurality of AV amplifiers 1-1 and 1-2, from among adaptable channel counts included in the performance information of the reproducing device 2 which is acquired by the performance information acquisition unit 52, based on the adaptable channel count included in the performance information of each of the AV amplifier devices 1 which is acquired by the performance information acquisition unit 52. The channel distribution unit 53 further distributes an audio channel to be processed to each of the plurality of AV amplifier devices 1-1 and 1-2, based on a channel count selected by the user from among the identified channel counts.

Further, the channel distribution unit 53 determines, for each one of the AV amplifier devices 1, which of the analog audio output terminals 103 is to be allocated for each audio channel to be processed that is distributed to the one of the AV amplifier devices 1, based on the configuration of the analog audio output terminals 103 which is included in the performance information of the one of the AV amplifier devices 1.

The channel distribution unit 53 also outputs connection guidance data for informing the user of which audio channels are distributed to which of the plurality of AV amplifier devices 1-1 and 1-2, to the man-machine interface unit 51.

The output delay time determination unit 54 determines an output delay time for each of the plurality of AV amplifier devices 1-1 and 1-2 so that timing of outputting an analog audio signal in the plurality of AV amplifier devices 1-1 and 1-2 is in synchronization with video output in the monitor 4, based on the signal processing times included in the performance information of each of the AV amplifier devices 1 and the performance information of the monitor 4 which are acquired by the performance information acquisition unit 52.

The settings information notification unit 55 notifies, via the near field communication interface unit 50, to each one of the AV amplifier devices 1, the settings information including audio channels distributed to the one of the AV amplifier devices 1 by the channel distribution unit 53 and an output delay time determined for the one of the AV amplifier devices 1 by the output delay time determination unit 54.

The main control unit 56 controls the units 50 to 55 of the operation terminal 5 in an integrated manner.

Next, operation of the operation terminal 5 is described.

Figure 5:
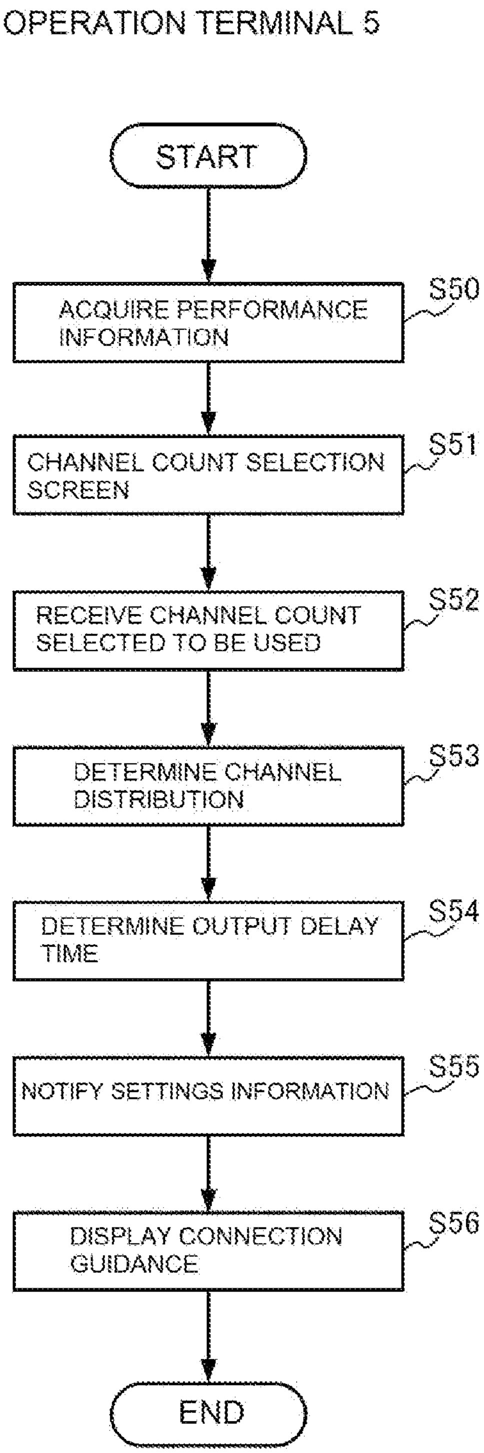
FIG. 5 is a flow chart for illustrating operation of the operation terminal (5).

FIG. 5 is a diagram for illustrating operation of the operation terminal 5.

This flow is started upon reception of the user's predetermined operation for building the AV system, via the man-machine interface unit 51.

First, the main control unit 56 instructs the performance information acquisition unit 52 to acquire the performance information. In response, the performance information acquisition unit 52 transmits an inquiry about the performance information to each of the AV amplifier devices 1 via the near field communication interface unit 50. The performance information acquisition unit 52 acquires, from the AV amplifier device 1-1, the performance information of the AV amplifier device 1-1 including an adaptable channel count, the configuration of the analog audio output terminals 103, and a signal processing time, the performance information of the reproducing device 2 including the adaptable channel count of the reproducing device 2, and the performance information of the monitor 4 including the signal processing time of the monitor 4, and acquires, from the AV amplifier device 1-2, the performance information of the AV amplifier device 1-2 including an adaptable channel count, the configuration of the analog audio output terminals 103, and a signal processing time (Step S50).

The main control unit 56 next gives the performance information of each of the AV amplifier devices 1 and the performance information of the reproducing device 2 that have been acquired by the performance information acquisition unit 52 to the channel distribution unit 53, and instructs the channel distribution unit 53 to distribute channels. In response, the channel distribution unit 53 identifies channel counts reachable through cooperation of the plurality of AV amplifier devices 1-1 and 1-2 from among adaptable channel counts included in the performance information of the reproducing device 2, based on the adaptable channel counts included in the pieces of performance information of the AV amplifier devices 1. The channel distribution unit 53 then creates channel count selection screen data for displaying a channel count selection screen including a list of the identified channel counts, and displays the channel count selection screen on the man-machine interface unit 51 (Step S51).

Figure 6:
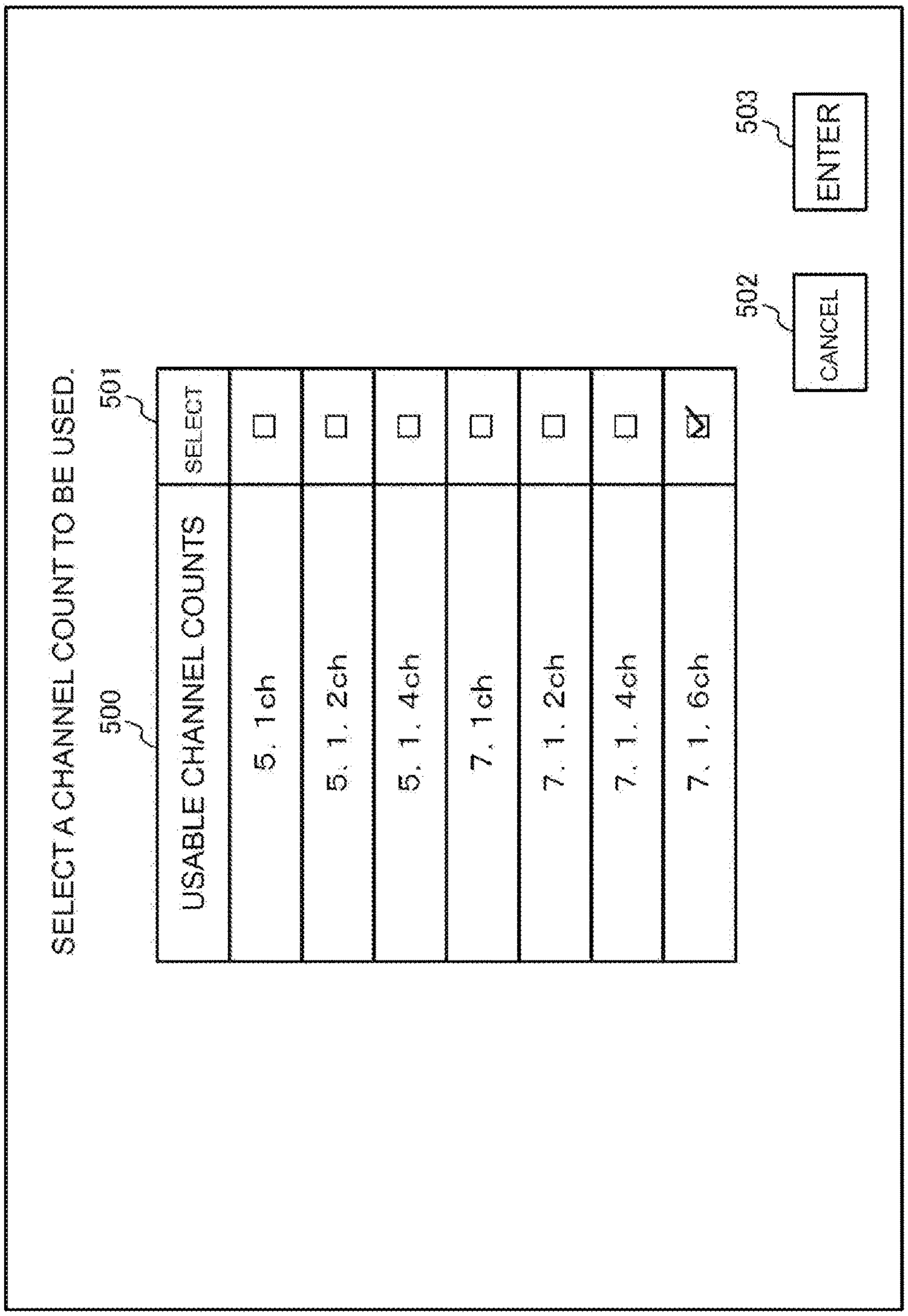
FIG. 6 is a diagram for illustrating a display example of a channel count selection screen.

FIG. 6 is a diagram for illustrating a display example of the channel count selection screen.

As illustrated in the figure, usable channel counts 500 are displayed in the form of a list on the channel count selection screen, along with checkboxes 501. A cancel button for unchecking the checkboxes 501 is denoted by a reference symbol 502. An enter button for confirming checking of one of the checkboxes 501 is denoted by a reference symbol 503. The user checks any one of the checkboxes 501 and selects the enter button 503 with the checkbox checked. A usable channel count associated with the one of the checkboxes 501 that is checked is thus selected as a channel count to be used. An example in which a channel count of 7.1.6 channels is selected is illustrated in FIG. 6.

Next, the man-machine interface unit 51 receives the selection of the channel count to be used from the user via the channel count selection screen (Step S52), and notifies the channel count selected to be used to the channel distribution unit 53. In response, the channel distribution unit 53 determines distribution of audio channels included in the channel count selected to be used to the plurality of AV amplifier devices 1-1 and 1-2, in accordance with a predetermined rule (Step S53).

For example, priorities of AV amplifier devices 1 are determined in descending order of adaptable channel counts. Here, any order of priority is determined for a plurality of AV amplifier devices 1 that have the same adaptable channel count. Next, audio channels are distributed to the AV amplifier devices 1 in descending order of priority, with major (basic) audio channels distributed first. For example, when the channel count to be used is a channel count of X.Y.Z channels, the audio channels are distributed in the order of X, Y, and Z. In an example illustrated in FIG. 1, a channel count of 7.1.6 channels is selected as a channel count to be used, audio channels corresponding to a "7.1" part (the front left channel FL, the front right channel FR, the center channel C, the surround left channel SL, the surround right channel SR, the surround back left channel SBL, the surround back right channel SBR, and the subwoofer channel SW) of the 7.1.6 channels are distributed to the AV amplifier device 1-1, and audio channels corresponding to a "6" part (remaining audio channels: the top front left channel TFL, the top front right channel TFR, the top middle left channel TML, the top middle right channel TMR, the top rear left channel TRL, and the top rear right channel TRR) of the 7.1.6 channels are distributed to the AV amplifier device 1-2. The channel distribution unit 53 allocates, for each one of the AV amplifier devices 1, the analog audio output terminals 103-1 to 103-8 to the audio channels distributed to the one of the AV amplifier devices 1, based on the configuration of the analog audio output terminals 103 which is included in the performance information of the one of the AV amplifier devices 1.

Next, the main control unit 56 gives the performance information of each of the AV amplifier devices 1 and the performance information of the monitor 4 that have been acquired by the performance information acquisition unit 52 to the output delay time determination unit 54, and instructs the output delay time determination unit 54 to determine output delay times. In response, the output delay time determination unit 54 determines an output delay time for each of the plurality of AV amplifier devices 1-1 and 1-2 so that timing of outputting an analog audio signal in the plurality of AV amplifier devices 1-1 and 1-2 is in synchronization with video output in the monitor 4, based on the signal processing times included in the pieces of performance information of the AV amplifier devices 1 and the monitor 4 (Step S54).

For example, when the signal processing times of the AV amplifier devices 1-1 and 1-2 are 50 ms and 70 ms, respectively, and the signal processing time of the monitor 4 is 100 ms, the output delay times of the AV amplifier devices 1-1 and 1-2 are determined to be 50 ms and 30 ms, respectively.

The main control unit 56 next notifies results of the processing in the channel distribution unit 53 and the output delay time determination unit 54 to the settings information notification unit 55, and instructs the settings information notification unit 55 to notify the settings information. In response, the settings information notification unit 55 creates, for each one of the AV amplifier devices 1, the settings information including audio channels to be processed that are distributed by the channel distribution unit 53 to the one of the AV amplifier devices 1, the analog audio output terminals 103 to which the audio channels to be processed are allocated, and an output delay time determined for the one of the AV amplifier devices 1 by the output delay time determination unit 54, and notifies the created settings information to the one of the AV amplifier devices 1 via the near field communication interface unit 50 (Step S55).

The main control unit 56 next instructs the channel distribution unit 53 to display the connection guidance. In response, the channel distribution unit 53 creates the connection guidance data for building an AV system at the channel count selected by the user to be used, and displays, on the man-machine interface unit 51, connection guidance based on this connection guidance data (Step S56).

Figure 7:
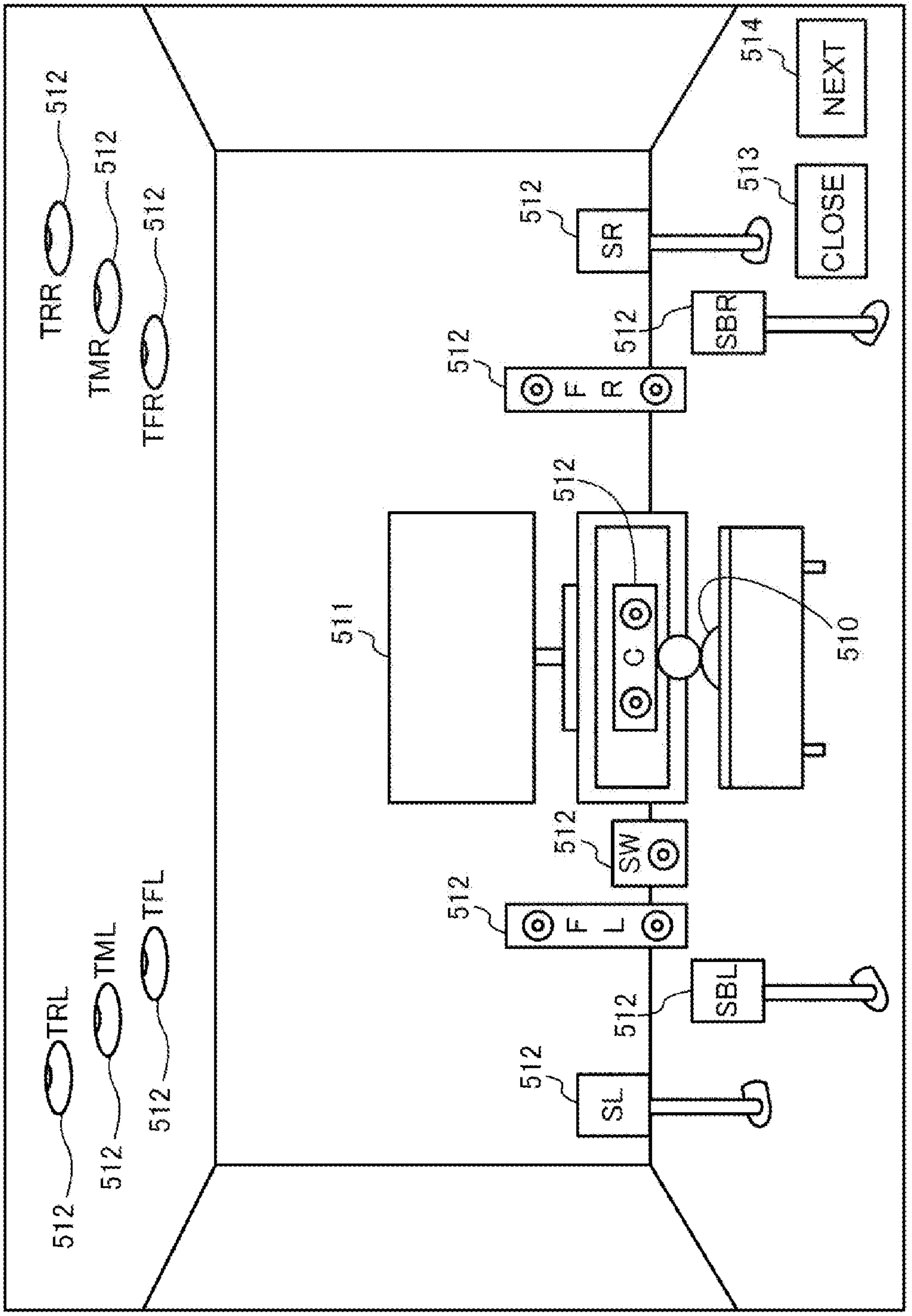
FIG. 7 is a diagram for illustrating a display example of a first screen of connection guidance.

FIG. 7 is a diagram for illustrating a display example of a first screen of the connection guidance.

As illustrated in the figure, the first screen of the connection guidance displays a recommended example of an arrangement position 511 of the monitor 4 and arrangement positions 512 of the speakers 3 for the audio channels included in the channel count to be used, in relation to a listening position 510 of the user. The recommended example illustrated in FIG. 7 is an example for a case in which the channel count to be used is a channel count of 7.1.6 channels. An end button for closing the first screen of the connection guidance that is being displayed is denoted by a reference symbol 513, and a switch button for switching the connection guidance from the first screen to a second screen described later is denoted by a reference symbol 514.

Figure 8:
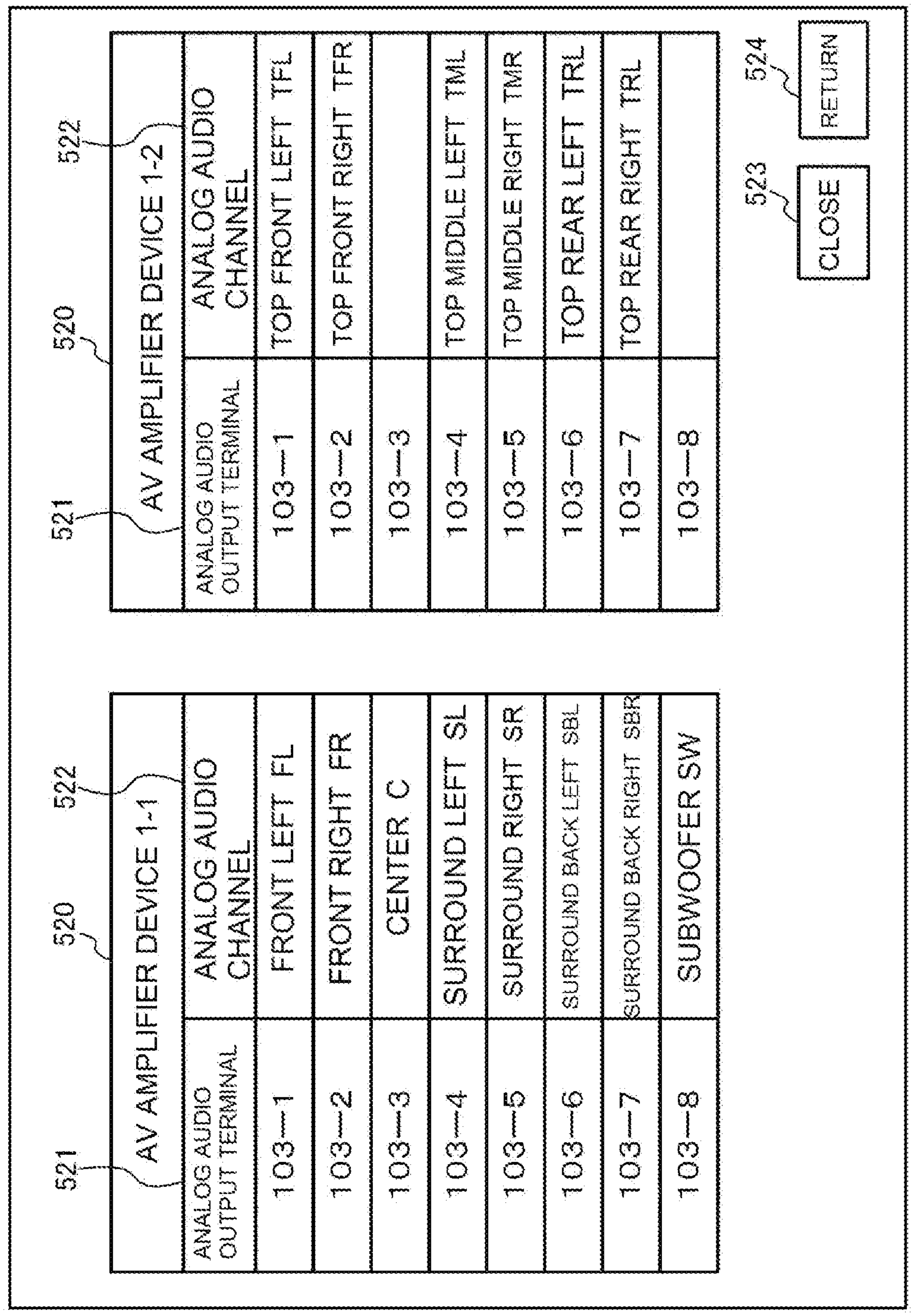
FIG. 8 is a diagram for illustrating a display example of a second screen of the connection guidance.

FIG. 8 is a diagram for illustrating a display example of the second screen of the connection guidance.

The second screen of the connection guidance is displayed when the switch button 514 is selected on the first screen of the connection guidance illustrated in FIG. 7.

As illustrated in the figure, the second screen of the connection guidance displays, for each one of the AV amplifier devices 1, a table 520 showing connection relationships between the analog audio output terminals 103 and analog audio channels. A field for displaying identification information of the analog audio output terminal 103 is denoted by a reference symbol 521. A field for displaying an analog audio channel to be connected to one of the analog audio output terminals 103 that is displayed in the field 521 of the same row as that of the analog audio channel is denoted by a reference symbol 522. An end button for closing the second screen of the connection guidance that is being displayed is denoted by a reference symbol 523. A switch button for switching the connection guidance from the second screen to the first screen is denoted by a reference symbol 524. It is preferred that the table 520 display a product name, a serial number, and the like of the one of the AV amplifier devices 1. This facilitates grasping of an association relationship to the actual one of the AV amplifier devices 1. A product name, a serial number, and the like of the AV amplifier devices 1 may be included in the performance information so that those pieces of information are acquired from the AV amplifier devices 1 along with adaptable channel counts, the configuration of the analog audio output terminals 103, and the signal processing time.

One embodiment of the present invention is described above.

In this embodiment, the operation terminal 5 distributes audio channels to be processed among AV amplifier devices 1, and determines an output delay time for each of the AV amplifier devices 1, and thus a digital AV signal including a multi-channel digital audio signal is processed through cooperation of the plurality of AV amplifier devices 1. Therefore, the multi-channel digital audio signal can be listened to at a channel count too high to be dealt with by one of the AV amplifier devices 1 by itself, and a user can increase the channel count by adding to the AV amplifier devices 1 owned by the user, instead of replacing the owned AV amplifier devices 1 with a newly purchased device. According to this embodiment, listening at a desired channel count is thus accomplished at a lower cost without wasting resources.

In this embodiment, the operation terminal 5 identifies channel counts reachable through cooperation of the plurality of AV amplifier devices 1, from among channel counts supported by the multi-channel digital audio signal, based on an adaptable channel count included in the performance information acquired from each of the AV amplifier devices 1, and distributes audio channels included in a channel count selected by a user from the identified channel counts among the AV amplifier devices 1. The user can accordingly build an AV system by selecting a desired channel count from channel counts reachable through cooperation of the plurality of AV amplifier devices 1.

In this embodiment, the operation terminal 5 distributes the audio channels to be processed to the AV amplifier devices 1 in descending order of adaptable channel counts of the AV amplifier devices 1. The AV amplifier devices 1 adaptable to more channel counts are considered to be higher in quality and processing capability. Therefore, an AV system having a higher quality can be built by distributing audio channels to the AV amplifier devices 1 in descending order of adaptable channel counts of the AV amplifier devices 1 and distributing major audio channels first.

In this embodiment, the operation terminal 5 outputs the connection guidance for informing the user about which audio channel is distributed to which of the plurality of AV amplifier devices 1. This enables the user to build an AV system by referring to the connection guidance, thus improving user-friendliness.

The present invention is not limited to the embodiment described above, and various modifications may be made thereto within the scope of the gist of the present invention.

For example, in the embodiment described above, the AV amplifier devices 1 each adjust timing of outputting, from one of the analog audio terminals 103, an analog audio signal that has been created through decoding by the audio signal processing unit 106, by outputting the analog audio signal to one of the delay buffers 105 and buffering the analog audio signal in the one of the delay buffers 105 by an output delay time set by the distribution/delay setting unit 114. However, the present invention is not limited thereto. The timing of outputting the analog audio signal from one of the analog audio terminals 103 may be adjusted by using the audio signal processing unit 106 to delay, based on an output delay time set by the distribution/delay setting unit 114, processing of creating an analog audio signal through decoding. In this case, the delay buffers 105 can be omitted.

Figure 9:
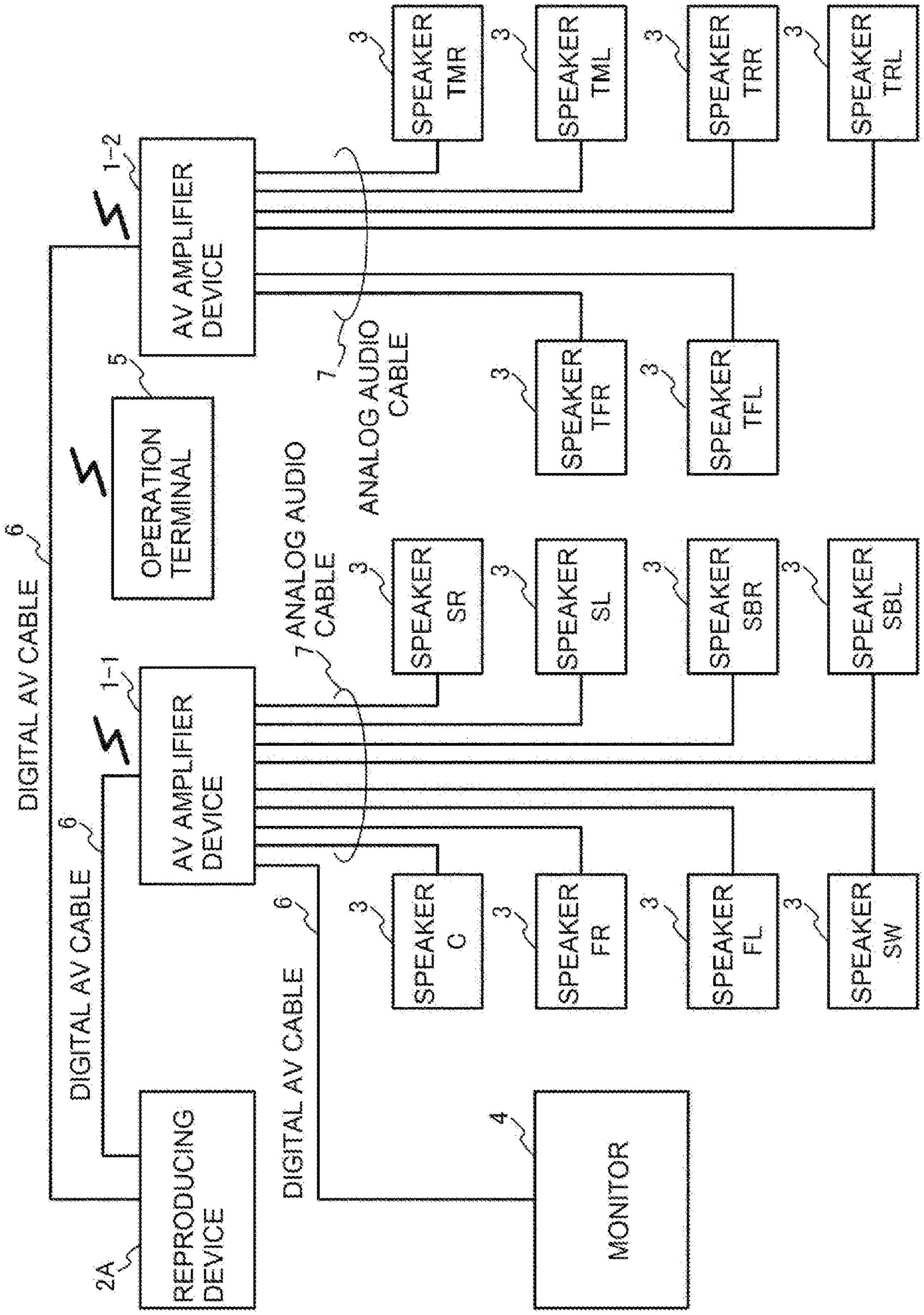
FIG. 9 is a schematic configuration diagram of a first modification example of the AV system illustrated in FIG. 1.
Figure 10:
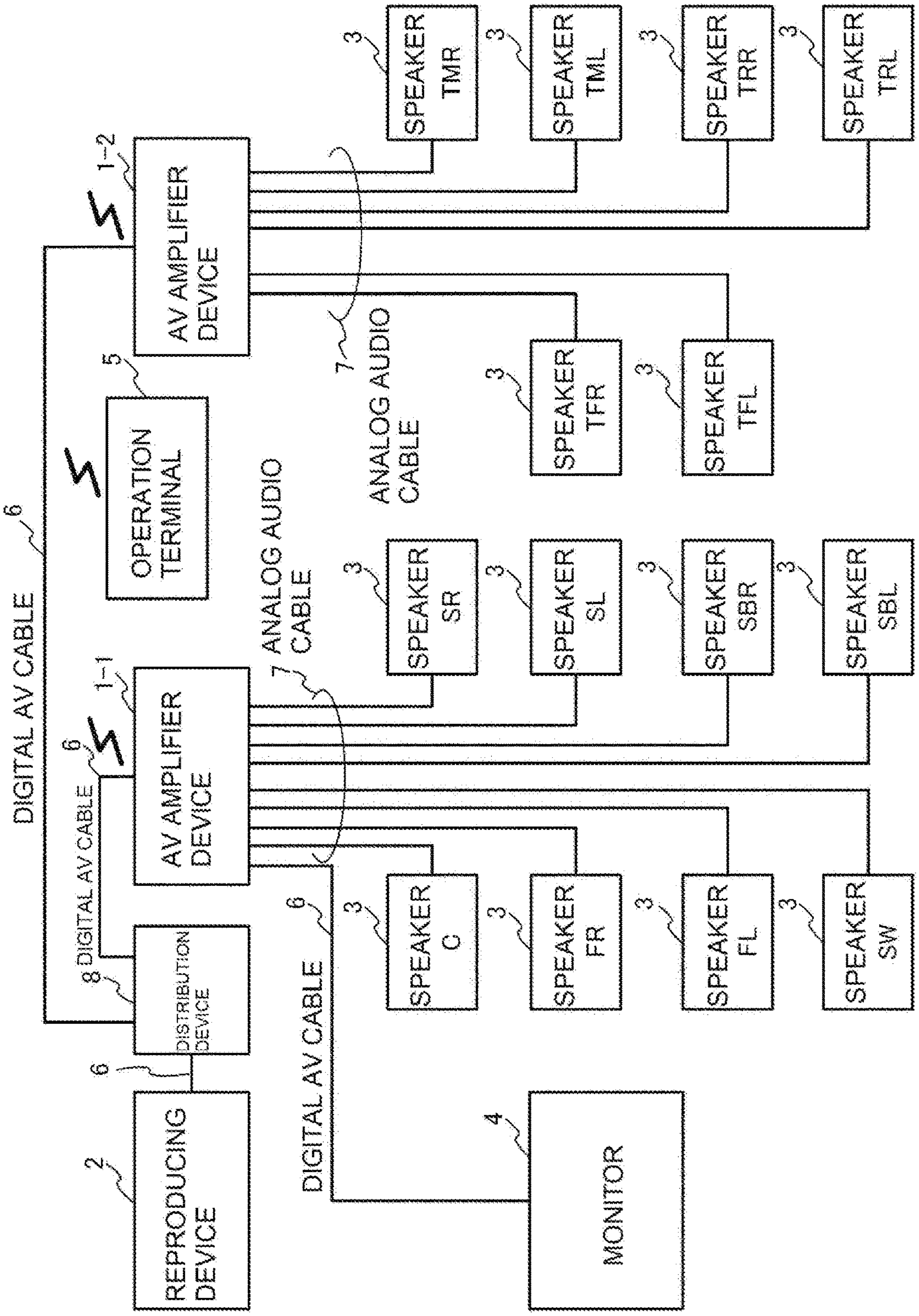
FIG. 10 is a schematic configuration diagram of a second modification example of the AV system illustrated in FIG. 1.

In the embodiment described above, the plurality of AV amplifier devices 1-1 and 1-2 are connected in series, with the reproducing device 2 as a starting point, but the present invention is not limited thereto. The plurality of AV amplifier devices 1-1 and 1-2 may be connected in parallel via a reproducing device 2A as in a first modification example of the present invention illustrated in FIG. 9. As another example, the plurality of AV amplifier devices 1-1 and 1-2 may be connected in parallel via a distribution device 8 which is connected to the reproducing device 2 and which distributes a digital AV signal output from the reproducing device 2 to a plurality of components as in a second modification example of the present invention illustrated in FIG. 10.

In the embodiment described above, two AV amplifier devices 1-1 and 1-2 are connected in series, but three or more AV amplifier devices 1 may be connected in series. Similarly, in the first modification example illustrated in FIG. 9 and the second modification example illustrated in FIG. 10, two AV amplifier devices 1-1 and 1-2 are connected in parallel, but three or more AV amplifier devices 1 may be connected in parallel.

In the embodiment described above, HDMI (trademark) interfaces are used as connection interfaces between the AV amplifier devices 1 and the reproducing device 2, between the AV amplifier devices 1 and the monitor 4, and between one of the AV amplifier devices 1 and another of the AV amplifier devices 1. However, the present invention is not limited thereto. For example, a universal serial bus (USB) interface or any other connection interface may be used as long as a digital AV signal can be transmitted and received through the interface.

In the embodiment described above, the operation terminal 5 acquires the performance information of the reproducing device 2 from one of the AV amplifier devices 1 that is connected to the reproducing device 2 via one of the digital AV cables 6. However, the present invention is not limited thereto. The operation terminal 5 may acquire the performance information of the reproducing device 2 directly from the reproducing device 2 by providing the reproducing device 2 with a connection interface (near field communication interface) to the operation terminal 5.

similarly, in the embodiment described above, the operation terminal 5 acquires the performance information of the monitor 4 from one of the AV amplifier devices 1 that is connected to the monitor 4 via one of the digital AV cables 6. However, the present invention is not limited thereto. The operation terminal 5 may acquire the performance information of the monitor 4 directly from the monitor 4 by providing the monitor 4 with a connection interface (near field communication interface) to the operation terminal 5.

Further, in the embodiment described above, the functional configuration of each of the AV amplifier devices 1 which is illustrated in FIG. 2 may be implemented by hardware through use of an integrated logic IC, for example, an application specific integrated circuit (ASIC) or a field programmable gate array (FPGA), or may be implemented by software through use of a computer, for example, a digital signal processor (DSP). Alternatively, the functional configuration may be implemented by a general computer, for example, a personal computer including a central processing unit (CPU), a memory, a flash memory, a hard disk drive or another such auxiliary storage device, a wireless LAN adaptor or another such communication device, a speaker, and a microphone, causing the CPU to load a predetermined program into the memory from the auxiliary storage device and execute the program.

In the embodiment described above, the function configuration of the operation terminal 5 which is illustrated in FIG. 4 may be implemented by a CPU by loading a predetermined program into a memory from an auxiliary storage device and executing the program in a smartphone, a tablet PC, or another portable terminal that includes the CPU, the memory, the auxiliary storage device which is a flash memory or the like, a communication device which is a wireless LAN adapter or the like, and an input device and a display device which are a touch-sensitive display or the like.

The embodiment described above takes as an example the plurality of AV amplifier devices 1 for processing a digital AV signal including a multi-channel digital audio signal and a multi-channel digital video signal in cooperation with one another, and an AV system including the plurality of AV amplifier devices 1. However, the present invention is not limited thereto. The present invention is applicable to a wide range of audio devices for processing a multi-channel digital audio signal through cooperation of a plurality of audio devices, and a wide range of audio systems each including a plurality of such audio devices.

In this case, the operation terminal 5 distributes audio channels to be processed among those audio devices, and determines, based on a signal processing time of each of the audio devices, an output delay time of each of the audio devices so that timing of outputting an analog audio signal matches for all of the audio devices. Each of the audio devices decodes the multi-channel digital audio signal input thereto into an analog audio signal for the audio channel distributed by the operation terminal 5 to the own device, and outputs the analog audio signal created by the decoding with a delay of the output delay time determined by the operation terminal 5 for the own device.

REFERENCE SIGNS LIST

1, 1-1, 1-2: AV amplifier device, 2, 2A: reproducing device, 3: speaker, 4: monitor, 5: operation terminal, 6: digital AV cable, 7: analog audio cable, 8: distribution device, 50: near field communication interface unit, 51: man-machine interface unit, 52: performance information acquisition unit, 53: channel distribution unit, 54: output delay time determination unit, 55: settings information notification unit, 56: main control unit, 100: digital AV input terminal, 101-1, 101-2: digital AV output terminal, 102: relay unit, 103-1 to 103-8: analog audio output terminal, 104-1 to 104-8: amplifier, 105-1 to 105-8: delay buffer, 106: audio signal processing unit, 107: near field communication interface unit, 108: performance information acquisition unit, 109: performance information notification unit, 110: settings information reception unit, 111: distribution/delay setting unit

The invention claimed is:

1. An operation terminal for causing a plurality of audio devices to process a multi-channel digital audio signal through cooperation among the plurality of audio devices, comprising:

performance information acquisition means configured to acquire, from each one of the plurality of audio devices, performance information including an adaptable channel count and a signal processing time of the one of the plurality of audio devices;

channel distribution means configured to:

distribute an audio channel to be processed to each of the plurality of audio devices, based on the adaptable channel count included in the performance information acquired by the performance information acquisition means from each of the plurality of audio devices, identify channel counts reachable through cooperation of the plurality of audio devices from among channel counts supported by the multi-channel digital audio signal, based on the adaptable channel count that is included in the performance information acquired by the performance information acquisition means from each of the plurality of audio devices, distribute audio channels included in a channel count selected by a user from among the identified channel counts to the plurality of audio devices, distribute the audio channels to be processed to the plurality of audio devices in descending order of the adaptable channel counts of the plurality of audio devices, wherein major or basic audio channels are to be distributed first, and output connection guidance for informing a user about which audio channel is to be distributed to which of the plurality of audio devices, at least some of the connection guidance is to be displayed on a display;

output delay time determination means configured to determine, for each of the plurality of audio devices, an output delay time so that timing of outputting an analog audio signal matches in the plurality of audio devices, based on the signal processing time included in the performance information acquired by the performance information acquisition means from each of the plurality of audio devices; and settings information notification means configured to notify, to each one of the plurality of audio devices, settings information including the audio channel to be processed that is distributed to the one of the plurality of audio devices by the channel distribution means and the output delay time determined for the one of the plurality of audio devices by the output delay time determination means.

2. An audio system for processing a multi-channel digital audio signal, comprising:

the operation terminal of claim 1; and the plurality of audio devices configured to process, in accordance with an instruction from the operation terminal, the multi-channel digital audio signal through cooperation with one another, wherein each of the plurality of audio devices includes:

audio signal processing means configured to decode the multi-channel digital audio signal input thereto into an analog audio signal for an audio channel included in settings information notified from the operation terminal; and audio output delay means configured to output the analog audio signal created through decoding by the audio signal processing means with a delay of an output delay time included in the settings information notified from the operation terminal.

3. The audio system according to claim 2, wherein the plurality of audio devices are connected in series with a reproducing device as a starting point, and wherein each of the plurality of audio devices further includes:

input means to which a multi-channel digital audio signal output from the reproducing device or from another of the plurality of audio devices is to be input; and output means configured to output the multi-channel digital audio signal input to the input means to another of the plurality of audio devices.

4. The audio system according to claim 2, wherein the plurality of audio devices are connected in parallel via a reproducing device, or via a distribution device which is connected to the reproducing device and which is configured to distribute a multi-channel digital audio signal output from the reproducing device to a plurality of components, and wherein each of the plurality of audio devices further includes input means to which the multi-channel digital audio signal output from the reproducing device or the distribution device is to be input.

5. The audio system according to claim 2, wherein each of the plurality of audio devices is an audio visual device for processing a digital audio visual signal including a multi-channel digital audio signal and a multi-channel digital video signal, through cooperation of a plurality of audio visual devices, and is configured to output, when a display device is connected to an own device, the digital audio visual signal input thereto to the display device, wherein the performance information acquisition means is configured to acquire performance information including a signal processing time of the display device from one of the plurality of audio devices to which the display device is connected, and wherein the output delay time determination means is configured to determine an output delay time for each of the plurality of audio devices so that timing of outputting an analog audio signal in the plurality of audio devices is in synchronization with video output in the display device, based on signal processing times included in the pieces of performance information acquired by the performance information acquisition means from the plurality of audio devices and the display device.

6. The operation terminal according to claim 1, wherein the audio channels are to be distributed in the order of X, Y, and Z when the user's selected channel count is a channel count of X.Y.Z channels.

7. The operation terminal according to claim 1, wherein:
the user's selected channel count is a channel count of 7.1.6 channels,
audio channels corresponding to a "7.1" part of the 7.1.6 channels are to be distributed to a first audio device of the plurality of audio devices, and
audio channels corresponding to a "6" part of the 7.1.6 channels are to be distributed to a second audio device of the plurality of audio devices.

8. The operation terminal according to claim 1, wherein the channel distribution means is configured to allocate, for at least one audio device of the plurality of audio devices, one or more analog audio output terminals to the audio channels distributed to that at least one audio device, based on a configuration of analog audio output terminals included in the performance information of that at least one audio device.

9. The operation terminal according to claim 1, wherein a screen of the connection guidance displays one or more arrangement positions of respective one or more speakers for the audio channels included in the user's selected channel count.

10. The operation terminal according to claim 9, wherein the screen of the connection guidance displays the one or more arrangement positions of respective one or more speakers for the audio channels included in the user's selected channel count, in relation to a listening position of the user.

11. The operation terminal according to claim 1, wherein a screen of the connection guidance displays, for at least one audio device of the plurality of audio devices, a table showing one or more connection relationships between one or more analog audio output terminals and one or more analog audio channels.

12. A non-transitory computer-readable storage medium storing a program readable by a computer,
the program including instructions that, when executed by one or more processors of the computer, cause the computer to function as an operation terminal for causing a plurality of audio devices to process a multi-channel digital audio signal through cooperation among the plurality of audio devices,
the operation terminal including:
performance information acquisition means configured to acquire, from each of the plurality of audio devices, performance information including an adaptable channel count and a signal processing time;
channel distribution means configured to:
distribute an audio channel to be processed to each of the plurality of audio devices, based on the adaptable channel count included in the performance information acquired by the performance information acquisition means from each of the plurality of audio devices,
identify channel counts reachable through cooperation of the plurality of audio devices from among channel counts supported by the multi-channel digital audio signal, based on the adaptable channel count that is included in the performance information acquired by the performance information acquisition means from each of the plurality of audio devices,
distribute audio channels included in a channel count selected by a user from among the identified channel counts to the plurality of audio devices,
distribute the audio channels to be processed to the plurality of audio devices in descending order of the adaptable channel counts of the plurality of audio devices, wherein major or basic audio channels are to be distributed first, and
output connection guidance for informing a user about which audio channel is to be distributed to which of the plurality of audio devices, at least some of the connection guidance is to be displayed on a display;
output delay time determination means configured to determine, for each of the plurality of audio devices, an output delay time so that timing of outputting an analog audio signal matches in the plurality of audio devices, based on the signal processing time included in the performance information acquired by the performance information acquisition means from each of the plurality of audio devices; and
settings information notification means configured to notify, to each one of the plurality of audio devices, settings information including the audio channel to be processed that is distributed to the one of the plurality of audio devices by the channel distribution means and the output delay time determined for the one of the plurality of audio devices by the output delay time determination means.

* * * * *